(No Model.)
E. COOK.
VEHICLE SPRING.
No. 420,990. Patented Feb. 11, 1890.
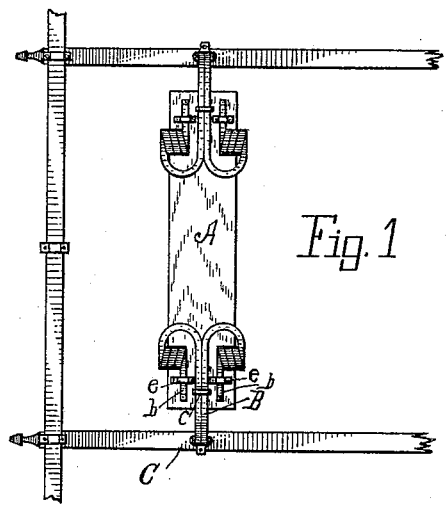
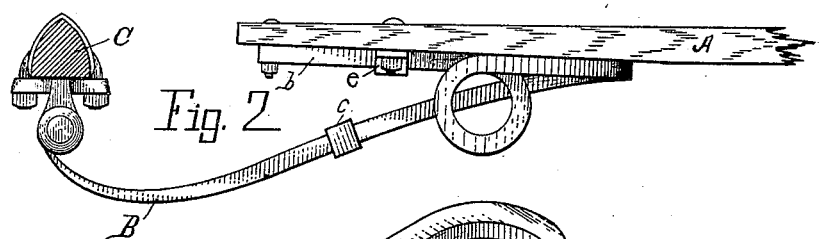
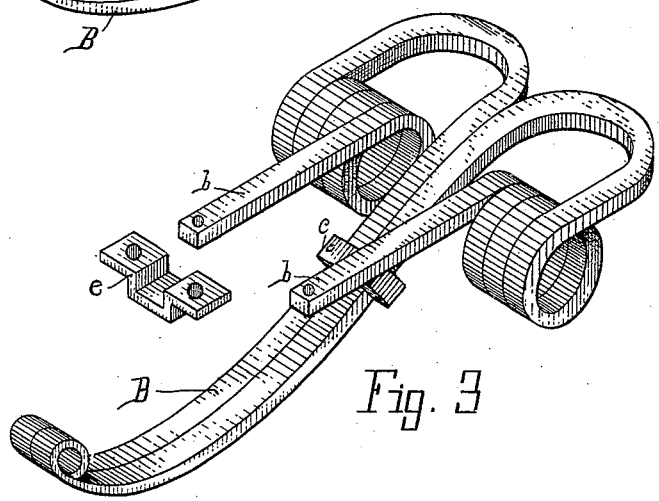
Witnesses:
Walter S. Wood
B. H. Brooke
Inventor.
Eugene Cook
By Lucius C. West
Atty

UNITED STATES PATENT OFFICE.

EUGENE COOK, OF KALAMAZOO, MICHIGAN.

VEHICLE-SPRING.

SPECIFICATION forming part of Letters Patent No. 420,990, dated February 11, 1890.

Application filed June 8, 1889. Serial No. 313,553. (No model.)

*To all whom it may concern:*

Be it known that I, EUGENE COOK, a citizen of the United States, residing at Kalamazoo, county of Kalamazoo, State of Michigan, have invented a new and useful Vehicle-Spring, of which the following is a specification.

This invention has for its object certain improvements in that class of vehicle-springs which are composed of spiral portions and suitable extended ends for attachment to the vehicle-body and to suitable supports disconnected from the body, all as below described and claimed.

In the drawings forming a part of this specification, Figure 1 is an inverted plan of a broken part of a vehicle running-gear employing my spring; Fig. 2, a side elevation, enlarged; and Fig. 3 is a perspective of lettered details in Fig. 2.

Referring to the lettered parts of the drawings, A will serve to illustrate a vehicle-body or a part of the bottom frame-work thereof, and C are the side bars.

The spring consists of two spirals on a like horizontal plane, end to end, but separated a little space from each other. At the outer ends of each spiral the metal of which they are composed is bent back and curved around one side of the spirals, thence brought forward side by side, and contacting with each other, and are extended between the contiguous ends of the spirals downward and forward, forming the arms B, which are attached together by a clip-tie c, and the free ends of these arms are attached to the side bars C, Figs. 1 and 2, or they may be attached to any suitable support disconnected from the particular vehicle-body to which they are attached. The inner ends of the spirals are extended into arms b for attachment to the vehicle-body. These arms b are parallel with the arms B, above the same in side elevation, and laterally removed from the same in plan view. At e are shown clips for assisting in attaching the arms b to the body. The elastic action of the spirals, rear loops, and arms B is so distributed over these parts that there is less direct action of the spirals, and the ordinary shock of the reaction of the spirals is lessened.

By making each half of this spring just alike and attaching them together with the duplicate parts in the relation here shown I am enabled to make the spirals smaller in diameter as compared with single springs of this class, use lighter steel, and one spring is a counter-balance to the other when in action.

Having thus described my invention, what I claim as new, and desire to secure by Letters Patent of the United States, is—

A vehicle-spring comprising the elastic bars formed into spirals, end to end, on the same horizontal plane, and separated from each other, the bars at the outer ends of the spirals extended back and looped around one side of the spirals, thence extending forward, side by side, between the contiguous ends of the spirals, and being attached together and forming an arm for attachment to a support disconnected from the vehicle-body, the bar at the inner end of each spiral being extended for attachment to a vehicle-body, substantially as set forth.

In testimony of the foregoing I have hereunto subscribed my name in presence of two witnesses.

EUGENE COOK.

Witnesses:
L. N. BURKE,
JAMES BAUMANN.